(12) United States Patent
Chockalingam et al.

(10) Patent No.: US 8,320,432 B1
(45) Date of Patent: Nov. 27, 2012

(54) DEVICE AND METHOD FOR PRECODING VECTORS IN A COMMUNICATION SYSTEM

(75) Inventors: Ananthanarayanan Chockalingam, Bangalore (IN); Balaji Sundar Rajan, Bangalore (IN); Saif Khan Mohammed, Bangalore (IN)

(73) Assignee: Indian Institute of Science at Bangalore, Karnataka (IN)

( * ) Notice: Subject to any disclaimer, the term of this patent is extended or adjusted under 35 U.S.C. 154(b) by 829 days.

(21) Appl. No.: 12/430,635

(22) Filed: Apr. 27, 2009

(51) Int. Cl.
H04B 1/38 (2006.01)
(52) U.S. Cl. ........ 375/219; 375/295; 375/296; 375/221; 375/220; 375/267; 375/285
(58) Field of Classification Search .................. 375/227, 375/316, 260, 261, 259
See application file for complete search history.

(56) References Cited

U.S. PATENT DOCUMENTS

| | | | | |
|---|---|---|---|---|
| 5,852,630 | A * | 12/1998 | Langberg et al. | 375/219 |
| 8,009,757 | B2 * | 8/2011 | Mroueh et al. | 375/295 |
| 2004/0198228 | A1 * | 10/2004 | Raghothaman | 455/63.1 |
| 2008/0181285 | A1 * | 7/2008 | Hwang et al. | 375/148 |
| 2008/0227422 | A1 * | 9/2008 | Hwang et al. | 455/278.1 |
| 2009/0059780 | A1 * | 3/2009 | De Lind Van Wijngaarden et al. | 370/201 |
| 2010/0061479 | A1 * | 3/2010 | Mazet et al. | 375/295 |

OTHER PUBLICATIONS

Transceiver Design with Vector Perturbation Technique and Iterative Power Loading by Ching-Chih Weng and P. P. Vaodyanathan, published on Apr. 19-24, 2009.*

A continuous Vector-Perturbation for Multi-Antenna Multi-User Communication by Wee Seng Chua, Chay Yuen and Francois Chin, published on 2007.*

A vector-perturnation technique for near capacity multiantenna multiuser communication—Part II Perturbation by Bertrnad M. Hochwald, Christian B. Peel, and A. Lee Swundlehurst, published on Mar. 2005.*

Efficient vector perturbation in multi-antenna multi-user sustems based on approximate integer relations by Diminik Seethaler and Gerald Matz published in Sep. 2006.*

Caire, et al. "On the Achievable Throughput of a Multiantenna Gaussian Broadcast Channel", IEEE Transactions on Information Theory, vol. 49, No. 7, pp. 1691-1706 (Jul. 2003).

Spencer, et al., "An Introduction to the Multi-User MIMO Downlink", Adaptive Antennas and MIMO Systems for Wireless Communications, IEEE Communications Magazine, pp. 60-67 (Oct. 2004).

Peel, "On Dirty-Paper Coding" Lecture Notes, IEEE Signal Processing Magazine, pp. 112-113 (May 2003).

Vishwanath, et al., "Duality, Achievable Rates, and Sum-Rate Capacity of Gaussian MIMO Broadcast Channels", IEEE Transactions on Information Theory, vol. 49, No. 10, pp. 2658-2668 (Oct. 2003).

Weingarten, et al., "The Capacity Region of the Gaussian MIMO Broadcast Channel", ISIT 2004, Chicago, USA, Jun. 27-Jul. 2, 2004, p. 174.

(Continued)

Primary Examiner — Siu Lee
(74) Attorney, Agent, or Firm — Brundidge & Stanger, P.C.

(57) ABSTRACT

A device and method for precoding vectors in a communication system is provided. A transmitter may precode a data vector using information regarding a communication channel prior to transmitting the data vector. The transmitter may precode the data vector in a manner that reduces an energy value of a resulting transmit data vector so as to minimize interference in a received signal at a receiver. The transmitter may perturb entries of the data vector one-by-one in an iterative fashion until a minimum in an energy value of the transmit data vector is obtained.

23 Claims, 7 Drawing Sheets

OTHER PUBLICATIONS

Peel, et al., "A Vector-Perturbation Technique for Near-Capacity Multiantenna Multiuser Communication—Part I: Channel Inversion and Regularization", IEEE Transactions on Communications, vol. 53, No. 1, pp. 195-202 (Jan. 2005).

Hockwald, et al., "A Vector-Perturbation Technique for Near-Capacity Multiantenna Multiuser Communication—Part II: Perturbation", IEEE Transactions on Communications, vol. 53, No. 3, pp, 537-544 (Mar. 2005).

Spencer, et al., "Zero-Forcing Methods for Downlink Spatial Multiplexing in Multiuser MIMO Channels", IEEE Transactions on Signal Processing, vol. 52, No. 2, pp. 461-471 (Feb. 2004).

"New Automatic Equaliser Employing Modulo Arithmetic", Electronics Letters, vol. 7, pp. 138-139, Mar. 25, 1971.

Tse, D., and Viswanath, P., "Fundamentals of Wireless Communication", Cambridge University Press, 2005.

Costa, Max H.M., "Writing on Dirty Paper," IEEE Transactions on Information Theory, May 1983, vol. IT-29, pp. 439-441.

Harashima, Hiroshi and Miyakawa, Hiroshi, "Matched-Transmission Technique for Channels with Intersymbol Interference," IEEE Transactions on Communications, Aug. 1972, vol. COM-20, No. 4, pp. 774-780.

Windpassinger, C., Fischer, R. F. H.. Vencel, T. and Huber, J. B., "Pre-Coding in Multiantenna and Multiuser Communications," IEEE Trans. Wireless Communication, Jul. 2004, vol. 3, pp. 1305-1316.

Choi, Lai-U. and Murch, Ross D., "A Transmit Preprocessing Technique for Multiuser MIMO Systems Using a Decomposition Approach," IEEE Transactions on Wireless Communications, Jan. 2004, vol. 3, No. 1, pp. 20-24, doi: 10.1109/TWC.2003.821148.

Windpassinger, C. and Fischer, R. F. H., "Low-Complexity Near-Maximum-Likelihood Detection and Precoding for MIMO Systems Using Lattice Reduction," Proceedings of IEEE ITW2003, Paris, Mar. 31-Apr. 4, 2003, pp. 345-348.

Windpassinger, C., Fischer, R. F. H., and Huber, J. B., "Lattice-Reduction-Aided Broadcast Precoding," IEEE Trans. Communication, Dec. 2004, Vol. 52, pp. 2057-2060.

Seethaler, D. and Matz, G., "Efficient Vector Perturbation in Multiantenna Multiuser Systems Based on Approximate Integer Relations," EUROSIPCO'2006, Florence, Italy, Sep. 2006.

Taherzadeh, M., Mobashcr, A., and Khandani, A., "LLL Lattice Basis Reduction Achieves the Maximum Diversity in MIMO Systems," Proc. IEEEISIT2005, Sep. 2005, pp. 1300-1304.

Mohammed, S. K., et al., "A Low-Complexity Precoder for Large Multiuser MISO Systems," IEEE Vehicular Technology Conference, 2008, VTC Spring, 2008, pp. 797-801.

* cited by examiner

Uncoded BER performance of the proposed NDS-MMSE precoder for different values of $(N_t, N_u)$. $N_r = 1$, BPSK. Achieved diversity increases with increased $(N_t, N_u)$.

FIG. 6

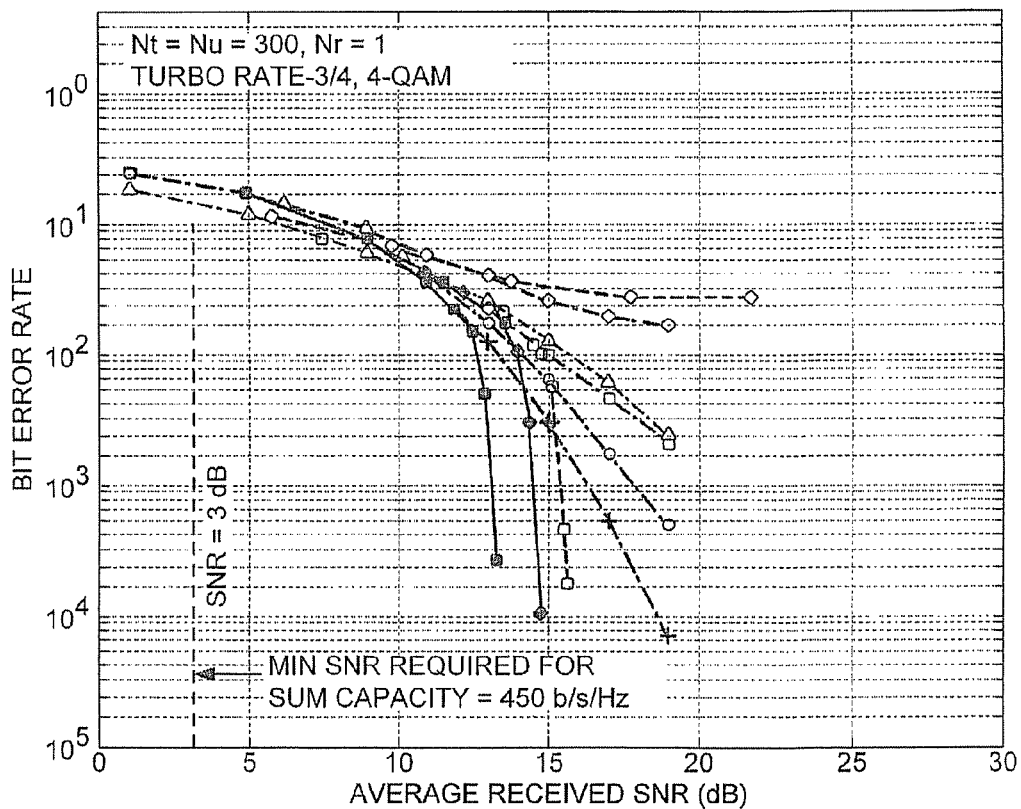

TURBO CODED BER PERFORMANCE OF THE PROPOSED NDS-MMSE
PRE-CODER WITHOUT AND WITH CHANNEL ESTIMATION ERRORS.
$N_t = N_u = 300$, $N_r = 1$, RATE-3/4 TURBO CODE, 4-QAM.
SUM RATE = 300 X 2 X 3/4 = 450 BITS/CHANNEL USE.

| | |
|---|---|
| —■— | TURBO NDS-MMSE (EST. ERR. VAR = 0) |
| —◆— | TURBO NDS-MMSE (EST. ERR. VAR = 0.02) |
| —□— | TURBO MMSE-ONLY (EST. ERR. VAR = 0) |
| —◇— | TURBO MMSE-ONLY (EST. ERR. VAR = 0.02) |
| --◇-- | UNCODED NDS-MMSE (EST. ERR. VAR = 0.05) |
| --□-- | UNCODED NDS-MMSE (EST. ERR. VAR = 0.02) |
| --○-- | UNCODED NDS-MMSE (EST. ERR. VAR = 0.01) |
| --+-- | UNCODED NDS-MMSE (EST. ERR. VAR = 0.0) |
| --△-- | UNCODED MMSE-ONLY (EST. ERR. VAR = 0) |

DEVICE AND METHOD FOR PRECODING VECTORS IN A COMMUNICATION SYSTEM

BACKGROUND

In conventional wireless communications, a single antenna is used at a source to wirelessly transmit a signal to a single antenna at a destination. In some cases, this gives rise to problems due to multipath effects. For example, when a wireless signal (an electromagnetic field) is met with obstructions such as hills, canyons, buildings, and utility wires, wavefronts are scattered, and thus may take many paths to reach the destination. Late arrival of scattered portions of the signal causes problems such as fading, cut-out, and intermittent reception.

Multiple input, multiple output (MIMO) is an antenna technology for wireless communications in which multiple antennas are used at both the source (transmitter) and the destination (receiver). The antennas at each end of the communication are combined to minimize errors and optimize data speed. MIMO is one of several forms of smart antenna technology. Other forms include multiple input, single output (MISO) and single input, multiple output (SIMO). Using smart antenna technology (e.g., multiple antennas at both the source and the destination) can eliminate the signal problems caused by multipath wave propagation, and can even take advantage of this effect.

Availability of channel status information (CSI) at a transmitter allows signal processing to be carried out at the transmitter in multiuser systems. Such pre-processing of signals before transmission, for instance, can achieve user interference suppression at the transmitter. For example, in a downlink multiuser MISO system (where a base station (BS) equipped with multiple transmit antennas sends data to multiple downlink users that each have one receive antenna), with the knowledge of both the channel matrix (e.g., obtained through feedback from receivers) as well as information symbols of all the users, the BS can perform "precoding" on the information symbol vector. Precoding on signals provides the ability to remove unwanted other-user signal interference at a desired user terminal, which allows the user terminal receiver to be less complex. Such pre-processing of signals has been described as dirty paper coding (DPC), which, in Gaussian broadcast multiuser MIMO channels, has been shown to theoretically achieve sum capacity (i.e., maximum aggregation of all users' data rates) that grows linearly with a minimum number of BS antennas ($N_t$) and number of users ($N_u$) provided that the transmitter and receivers all have knowledge regarding the channel.

However, practical pre-processing techniques that aim to achieve the sum capacity as promised by DPC are challenging. Linear precoders including normalized zero-forcing (ZF) and minimum mean square error (MMSE) precoders, and non-linear precoders including Tomlinson-Harashima precoders (THP) have relatively little complexity, but generally do not achieve full diversity in the system. Alternatively, other precoders based on vector perturbation and several other variants have been shown to achieve good performance at the expense of increased complexity.

SUMMARY

The present application describes a method of precoding vectors in a communication system. The method includes receiving an information symbol vector u and a channel matrix H, and calculating a transmit vector x using the information symbol vector u and the channel matrix H. The method further includes perturbing an entry of the information symbol vector u, and if an energy value of the transmit vector x decreased, the method includes perturbing another entry of the information symbol vector u. If the energy value of the transmit vector x did not decrease, the method includes transmitting the transmit vector x.

In another aspect, the present application describes a computer-readable medium containing a set of instructions for causing a computing device to perform the functions of receiving an information symbol vector u and a channel matrix H, and calculating a transmit vector x using the information symbol vector u and the channel matrix H. The functions further include perturbing an entry of the information symbol vector u, and if an energy value of the transmit vector x decreased, perturbing another entry of the information symbol vector u. Alternatively, if the energy value of the transmit vector x did not decrease, the functions include transmitting the transmit vector x.

In still another aspect, the present application describes a precoder that includes a vector perturbation unit and a processing unit. The vector perturbation unit receives an information symbol vector u and perturbs an entry of the information symbol vector u to generate a perturbed information symbol vector ũ. The processing unit receives a channel matrix H and calculates a transmit vector x using an information symbol vector and the channel matrix H. If an energy value of the transmit vector x is smaller when using the perturbed information symbol vector ũ as compared to when using the information symbol vector u, the processing unit instructs the vector perturbation unit to perturb another entry of the information symbol vector u.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

FIG. 6 illustrates example simulation results for the precoder that shows BER performance with and without channel estimation errors.

DETAILED DESCRIPTION

Figure 1:
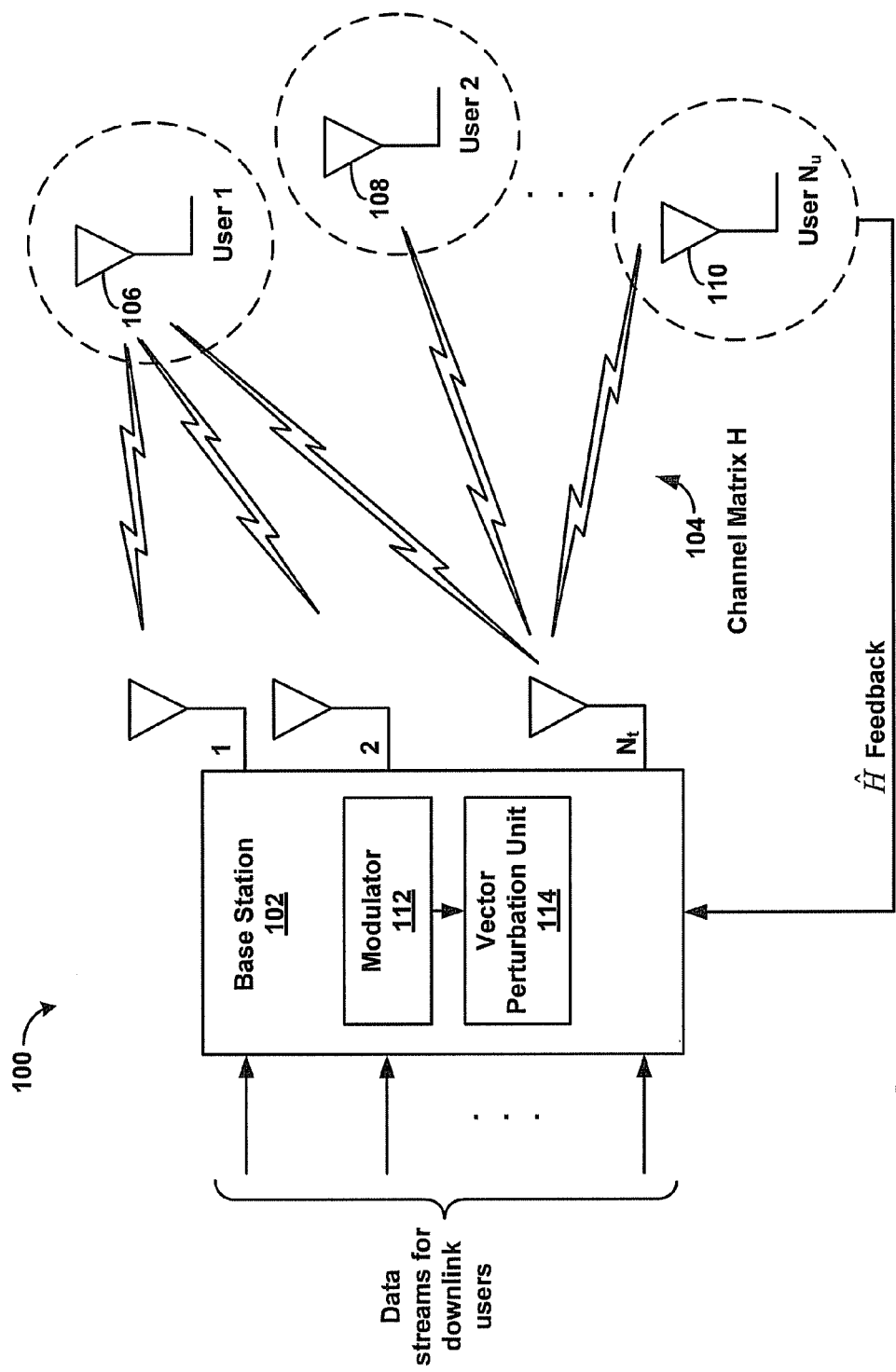
FIG. 1 is a block diagram of an example multiuser MISO system including a base station (BS) communicating with $N_u$ users on a downlink communication channel.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

In a wireless communication system in which a base station (BS) with a large number of antennas communicates on a downlink to multiple client devices, each of which has one antenna, a method of limiting interference at the client devices is presented. The communication system may be referred to as multiple input, single output (MISO), due to multiple antennas at a source (e.g., the BS) and one antenna at a destination (e.g., the client device). The communication system may be configured in the form of a worldwide interoperability for microwave access (WiMAX) or Wi-Fi system, for example.

The BS has data to send on the downlink to each client device, and further, the client devices may receive signals from other sources as well. Thus, the BS has a number of transmitters ($N_t$), and a number ($N_t$) of parallel streams of data exiting the BS. Each respective stream of data is intended for a respective client device, however, any client device within a coverage area of a transmitter will receive a data stream transmitted by the transmitter. This interference can lead to decoding difficulties at the client devices.

The BS may simply transmit a data vector (x) to a client device via a communication channel. However, if the client device and/or BS has information regarding the communication channel, the BS can use the information to pre-process or "precode" vector x prior to transmitting the vector to reduce or eliminate effects of interference at a receiver.

The present application describes example precoding techniques that may be used in large multiuser MISO Systems that have tens to hundreds of BS transmit antennas and tens to hundreds of single-antenna downlink users. A low-complexity precoder (e.g., norm descent search (NDS) precoder) is described that is a vector perturbation based precoder, which achieves low-complexity by searching for a perturbation vector over a reduced search space. The NDS precoder achieves increasingly better bit-error rate (BER) for increasing number of base station antennas ($N_t$) and users ($N_u$), such that for large $N_t/N_u$, the precoder achieves near-exponential diversity with some signal-to-noise ratio (SNR) loss. The precoder is well-suited for large MISO systems in terms of both complexity as well as performance.

Referring now to the figures, FIG. 1 is a block diagram of an example multiuser MISO system 100 including a base station (BS) 102 communicating with $N_u$ users on a downlink communication channel 104. The BS 102 includes transmit antennas 1, 2, ..., $N_t$, and each downlink user is equipped with one receive antenna, such as antennas 106, 108 and 110. The BS 102 also includes a modulator 112 and a vector perturbation unit 114 to precode data streams prior to transmitting the data streams to the $N_u$ downlink users.

The downlink communication channel 104 can be described by a channel matrix H. The BS 102 can use the channel matrix H for determining beamforming coefficients (beamforming/steering vectors) to properly steer a transmission beam of the antennas 1, 2, ..., $N_t$ to achieve higher throughput. Thus, the channel matrix H may be used as an accurate estimate of the communication channel. The BS 102 may receive a signal from any of the users 1, 2, ..., $N_u$ that includes the channel matrix H using channel reciprocity. Generally, channel reciprocity requires calibrated radio frequency (RF) chains in MISO systems and further may require that the forward/reverse communication links operate in a time division duplex (TDD) mode. The BS 102 may receive information from any of the users using TDD so as to separate outward and return signals In another example, the users may make a direct estimate of the channel 104, e.g., using training symbols sent to the users from the BS 102. The users can then send feedback channel information based on a channel estimate $\hat{H}$ to the BS 102. The BS 102 may then compute beamforming/steering vectors using the channel estimate $\hat{H}$ returned by the users. Thus, the BS 102 can use information about the downlink communication channel 104 to precode vectors that will be transmitted to the users.

Figure 2:
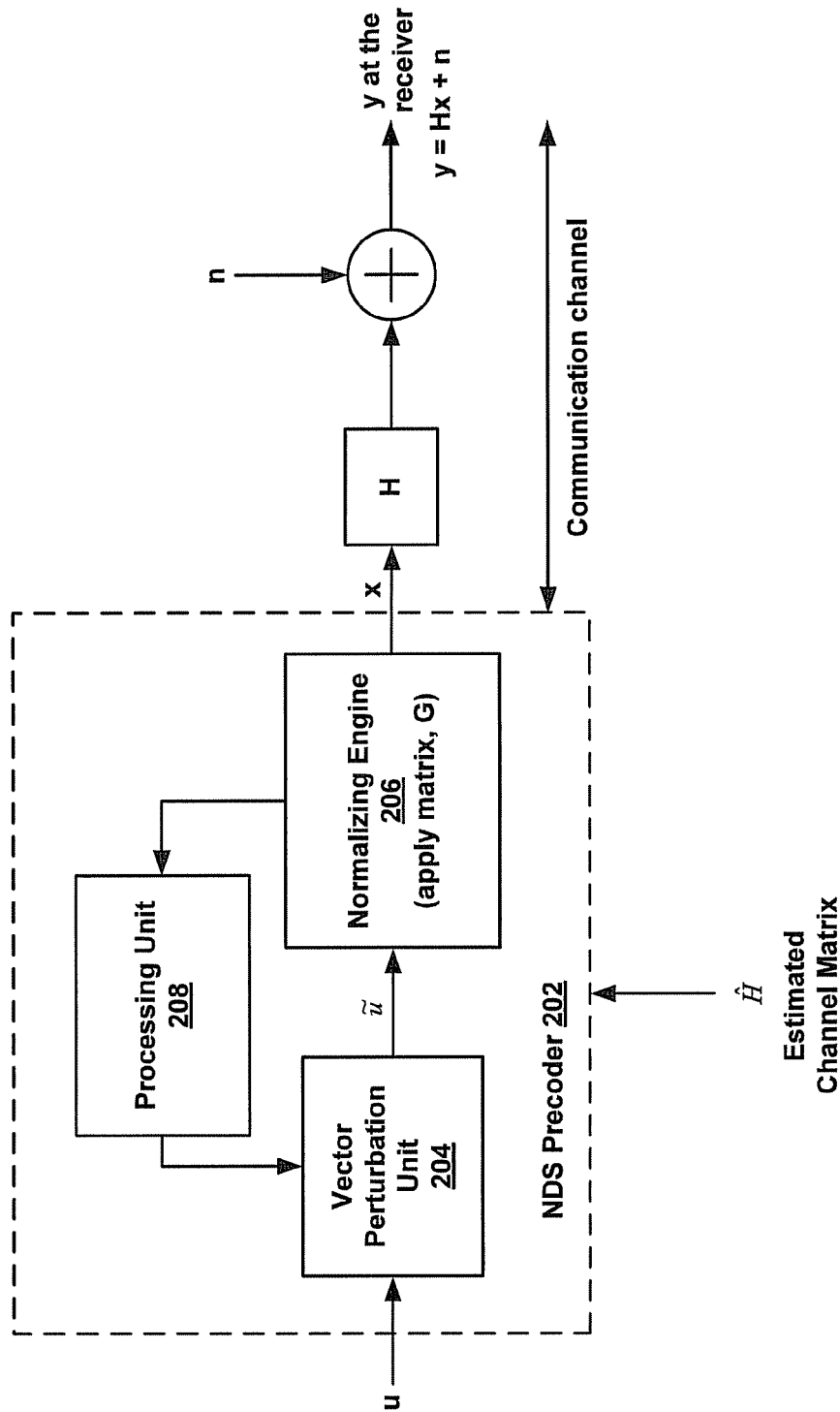
FIG. 2 illustrates an example conceptual signal transmission diagram.

FIG. 2 illustrates an example conceptual signal transmission diagram. A complex information symbol vector u may be used to encode data streams for the downlink users. Precoding on the symbol vector u can then be performed to obtain a precoded symbol vector x, which is transmitted using the $N_t$ transmit antennas of the BS 102. The precoded symbol vector x may be transmitted such that an ith symbol of vector x is transmitted on the ith transmit antenna, where i=1, 2, ..., $N_t$.

A capacity of the MISO system 100 is in direct proportion to the number of BS antennas $N_t$. To increase capacity of the system 100, the number of BS antenna $N_t$ can be increased. To choose a precoding algorithm for a large number of BS antennas, it is desirable to minimize an energy of vector x. For example, to transmit vector u, the precoding algorithm will be multiplied by vector u and minimize an amount of energy the transmitted symbol vector x.

Initially, a data signal u is received at a norm decent search (NDS) precoder 202, which perturbs the data signal u to a transformed vector ũ using a vector perturbation unit 204. A normalizing engine 206 applies a normalizing matrix G to the transformed vector ũ to obtain the transmit vector x. A processing unit 208 then determines an energy of the transmit vector, and if the energy is in an acceptable range, the vector may be transmitted. If the energy is not in an acceptable range, the processing unit 208 may instruct the vector perturbation unit 204 to perturb another entry of the vector ũ. The energy level of the transmit vector may be considered to be in an acceptable range when the energy level is not less than a previous iteration energy level. Thus, the precoder 202 may perform in an iterative fashion, such that entries of the vector are perturbed sequentially or one at a time until a low energy level of the transmit vector is obtained. The transmit vector x is transmitted across the communication channel to users and a vector y is received at a receiver. The vector y is given by Equation (1) below:

$$y = Hx + n \quad \text{Equation (1)}$$

where y is an ($N_u \times 1$) received vector, H is the channel matrix, vector $x = [x_1, x_2, \ldots, x_{Ns}]^T$ is an ($N_s \times 1$) vector of transmitted symbols, and n is an ($N_u \times 1$) noise vector. The channel matrix H is an ($N_u \times N_t$) matrix of channel coefficients that include complex fading coefficients between the transmit antennas and the user antennas.

Note that the vectors u, x, y, H, and n are complex vectors and can be decomposed into real and imaginary parts as follows:

$$u_c = u_I + j u_Q, \ x_c = x_I + j x_Q, \ y_c = y_I + j y_Q, \ H_c = H_I + j H_Q,$$
$$n_c = n_I + j n_Q. \quad \text{Equation (2)}$$

The discussion below considers the real-valued system, where:

$$y_r = H_r x_r + n_r \quad \text{Equation (3)}$$

and the subscript "r" is dropped for convenience. With the above-real-valued system model, the real part of the original complex information symbols (i.e., $u_c$) will be mapped to $[u_1, \ldots u_{Nu}]$ and the imaginary part of these symbols will be mapped to $[u_{Nu+1}, \ldots u_{2Nu}]$. For M-PAM modulation (pulse-amplitude modulation), $[u_{Nu+1}, \ldots u_{2Nu}]$ will be zeros since M-PAM symbols take only real values. In the case of M-QAM (quadrature amplitude modulation), $[u_1, \ldots u_{Nu}]$ and $[u_{Nu+1}, \ldots u_{2Nu}]$ can be viewed to be from an underlying M-PAM signal, for example.

In one example, the vector perturbation unit 114 applies a linear transformation to the data vector u to obtain the vector x to be transmitted such that:

$$x = Gu \quad \text{Equation (4)}$$

where G is an $(N_t \times N_s)$ linear precoding matrix. The column dimension $N_s$ of G can be selected to be smaller than $N_t$, for example. The unit-norm transmitted symbol vector x can be written as:

$$x = \frac{Gu}{\|Gu\|} \quad \text{Equation (5)}$$

If the matrix G is selected to be an inverse of the communication channel matrix H, applying the inverse of the channel matrix H to the vector u will cancel out interference of the wireless communication channel 104, and a receiver may receive vector y that does not include interference.

For example, if y is a signal vector of a received signal, H is the channel matrix, x is symbol vector of a transmitted signal, and n is a noise vector at the receiver, and if the transmitter has knowledge of the channel matrix H, then instead of transmitting a vector x, the BS can transmit inv (H)x, which is one example of a precoding function. The signal at the receiver would thus be as shown in Equation (3) below:

$$y = HH^{-1}x + n$$

$$y = x + n \quad \text{Equation (6)}$$

Thus, other user interference can be removed. The receiver in this case would not require interference cancellation, and hence, a lower complexity receiver can be used.

The above example illustrates a zero-forcing (ZF) linear precoder with $N_t \geq N_u$, where the precoding matrix is given by:

$$G_{ZF} = H^T(HH^T)^{-1} \quad \text{Equation (7)}$$

and the corresponding received signal vector y is given by:

$$y = \frac{u}{\|Gu\|} + n \quad \text{Equation (8)}$$

Thus, in one application, at each time instant, the BS intends to transmit K complex valued data symbols dk, k= 1, ..., K, which are picked from a symbol alphabet. The kth data symbol dk is intended for user k. With perfect channel state information at the transmitter, interference free transmission to each user could theoretically be achieved by using zero-forcing precoding/pre-equalization by applying a precoding matrix to the data vector that equals the inverse of the channel. The transmit vector is then obtained by a normalization of the precoded data vector.

However, perfect channel state information is not always available, and thus in example embodiments, a vector perturbation technique is also applied to the data vector, and the data vector undergoes precoding to improve performance of the BS.

In Equation (8), the value $\|Gu\|$ has a scaling effect on an instantaneous received SNR, and for poorly conditioned channels, a loss in SNR can occur. If the value of $\|Gu\|$ is known at the receiver so that the received signal is scaled by $\|Gu\|$ prior to detection, in order to improve performance, $\|Gu\|$ needs to be minimized. One technique to minimize the value of $\|Gu\|$ is to perturb the information symbol vector u in such a way that a transformed vector $\tilde{u}$ is another point in the constellation lattice, but that the value of $\|G\tilde{u}\|$ is less than $\|Gu\|$.

Vector perturbation augments zero-forcing precoding with an additive perturbation of the data vector followed by appropriate power normalization in order to enable users to perform data detection in a non-cooperative and low-complexity manner. Vector perturbation is performed by adding to the data vector u a vector (e.g., $\tau p$), in which $\tau$ is a positive real number and each component of the vector p is a complex number whose real and imaginary parts are both integers. For appropriate values of the coefficient $\tau$, each receiver can apply a function that effectively subtracts out the perturbation and restores, in approximation, an unperturbed version of the data vector destined for transmission to that receiver. The vector p is designed to lead to minimal, or at least relatively small, values of total signal energy.

Referring to FIG. 1, to transmit a signal, the modulator 112 modulates the symbol vector u by mapping an information bit to a constellation point according to a modulation scheme, and outputs the modulated symbol to the vector perturbation unit 114, which performs pre-coding by adding an offset vector to the modulated symbol, and outputs the precoded symbol vector x for transmission. The vector perturbation unit 114 applies an integer offset vector to maximize an SNR at the receiver. An optimal offset vector is obtained by solving an integer programming problem that restricts all variables to have only integer values. Because a received signal may be affected by vector perturbation, the vector perturbation is removed by a receiver that performs a modulo operation, and thus prevents distortion from being added to the signal.

Specifically, the information symbol vector u is perturbed in such a way that a transformed vector $\tilde{u}$ is another point in the constellation lattice, such that:

$$\tilde{u} = u + \tau p \quad \text{Equation (9)}$$

where $p \in Z^{2Nu \times 1}$ is the perturbation vector and $\tau$ is a positive real number. An optimal value of $\tilde{u}$, denoted by $\tilde{u}_{opt}$, is given by:

$$\tilde{u}_{opt} = U + \tau p_{opt} \quad \text{Equation (10)}$$

$$p_{opt} = \operatorname*{argmin}_{p \in Z^{2N_u \times 1}} \|G(u + \tau p)\|^2 \quad \text{Equation (11)}$$

$\tau$ is a positive real scalar whose value is fixed. Choice of the value of $\tau$ affects the overall performance. Although selecting a high $\tau$ value can mitigate effect of noise at the receiver (e.g., since constellation replicas are placed far apart, and there is little probability that noise may push a point from one replica to another), selecting a high value of $\tau$ can result in a high value of $\|G(u+\tau \tilde{p})\|$. It has been empirically observed that a good choice of $\tau$ to mitigate noise but not result in too high a value of $\|G(u+\tau\tilde{p})\|$ is given by:

$$\tau = 2|c_{max}| + \delta \qquad \text{Equation (12)}$$

where $|c_{max}|$ is a maximum value of either the real or imaginary component of the constellation symbols, and $\delta$ is a spacing between the constellation symbols. For example, 16-QAM is effectively two 4-PAM constellations in quadrature (taking values of $-3, -1, 1, 3$ on the real and imaginary axis). Therefore, for 16-QAM, $|c_{max}|$ is 3, $\delta$ is 2, and so $\tau$ is 8. Similarly, for 4-QAM, $\tau$ is 4 (e.g., for QAM symbol alphabets, the constant $\tau$ can be chosen such that the extended symbol alphabet is a rectangular lattice so that $\tau=4$ for 4-QAM $\{1+j, 1-j, -1+j, -1-j\}$).

With vector perturbation, the data (to be transmitted via pre-equalization) is perturbed such that the transmit power is minimized, e.g., such that the value of p is minimized. An exact solution of Equation (11) may require exponential complexity in $N_u$, and may be prohibitively complex for large MISO systems with hundreds of transmit antennas/users. In example embodiments, an approximate low-complexity suboptimal solution is described. Transmit power can be minimized while also achieving computations efficiency.

The NDS precoder 202 is iterative in nature and achieves a suboptimal solution to Equation (11). Let $\tilde{u}^{(k)}$ be a perturbed information symbol vector after a kth iteration. Initially $\tilde{u}^{(0)}=u$, where u is the unperturbed information symbol vector. The symbol $\tilde{u}^{(k)}$ is perturbed to obtain $\tilde{u}^{(k+1)}$ as:

$$\tilde{u}^{(k+1)} = \tilde{u}^{(k)} + \tau p^{(k)} \qquad \text{Equation (13)}$$

where $p^{(k)} \in Z^{2Nu \times 1}$ for M-QAM, and $p^{(k)} \in Z^{2Nu \times 1}$ for M-PAM. To reduce the overall computational complexity of a proposed algorithm, $p^{(k)}$ is constrained to have only one non-zero entry.

Let $F \triangleq G^T G$, where $G \in R^{2Nt \times 2Nu}$ be the precoding matrix. Further, let $q^{(k)}$ be the power (squared-norm) of the precoded symbol vector $\tilde{u}$ after the kth iteration (e.g., $\tilde{u}^{(k)}$). Therefore, $q^{(k)}$ is given by $$q^{(k)} = \|G\tilde{u}^{(k)}\|^2 = \tilde{u}^{(k)T} F \tilde{u}^{(k)} \qquad \text{Equation (14)}$$

In the (k+1)th iteration, the algorithm finds a constrained integer vector $p^{(k)}$ such that $q^{(k+1)} < q^{(k)}$. Let a change of q be:

$$\Delta q^{(k+1)} \triangleq q^{(k+1)} - q^{(k)} \qquad \text{Equation (15)}$$

Let $e_i$ denote a $2N_u$-dimensional unit vector with its ith entry only to be one, and all other entries to be zero. Since $p^{(k)}$ is constrained to have only one non-zero entry, $p^{(k)}$ can be expressed as a scaled integer multiple of any $e_i$, $i=1, \ldots, 2N_u$. $\Delta q^{(k+1)}$ can be negative for more than one choice of i. To select the appropriate value for i, a minimal value of $\Delta q^{(k+1)}$ is determined when $p^{(k)}$ is a scaled integer multiple of $e_i$. For each i, there exists an integer $\lambda_i^{(k)}$ which minimizes $\Delta q_i^{(k+1)}$. Let this minimum value of $\Delta q_i^{(k+1)}$ be denoted by $\Delta q_{i,opt}^{(k+1)}$, where:

$$\Delta q_{i,opt}^{(k+1)} = \lambda_i^{(k)2} \tau^2 F_{i,i} + 2\lambda_i^{(k)} \tau z_i^{(k)} \qquad \text{Equation (16)}$$

and $F_{i,i}$ is the ith diagonal entry of F, $z_i^{(k)}$ is the ith entry of the vector $$z^{(k)} \triangleq F\tilde{u}^{(k)} \qquad \text{Equation (17)}$$

and $$\lambda_i^{(k)} = \underset{\lambda \in Z}{\text{argmin}} \, \Delta q_i^{(k+1)}, \qquad \text{Equation (18)}$$

$$= \underset{\lambda \in Z}{\text{argmin}} \|G(\tilde{u}^{(k)} + \lambda \tau e_i)\|^2 - \|G\tilde{u}^{(k)}\|^2,$$

$$= \underset{\lambda \in Z}{\text{argmin}} \lambda^2 F_{i,i} + \frac{2\lambda}{\tau} \tilde{u}^{(k)T} F e_i,$$

$$= \underset{\lambda \in Z}{\text{argmin}} \lambda^2 F_{i,i} + \frac{2\lambda}{\tau} z_i^{(k)}$$

The exact solution to the minimization problem in (18) is given by:

$$\lambda_i^{(k)} = -\text{sgn}(z_i^{(k)}) \left[ \frac{|z_i^{(k)}|}{\tau F_{(i,i)}} \right] \qquad \text{Equation (19)}$$

where sgn(.) is the signum function and [.] is the rounding operator. The value of $\Delta q_{i,opt}^{(k+1)}$ is always non-positive, which guarantees a monotonic descent in the value of $\|G\tilde{u}^{(k)}\|^2$ with every iteration until a local minima is reached.

Though (18) gives a closed-form solution to $\lambda_i^{(k)}$, it has been observed in simulations that in cases when $\lambda_i^{(k)}$ is large, the algorithm may progress to a poor local minima early in the algorithm. The value of $\lambda_i^{(k)}$ can be constrained to be within a set $S=\{-s_{max}, -(s_{maz}-1), \ldots, (s_{max}-1), S_{max}\}$, which is a finite subset of Z, and $s_{maz}$ denotes the maximum absolute value in S. For example, it has been observed through simulations for 4-QAM that the appropriate set S is $S=\{-1, 0, 1\}$. If $|\lambda_i^{(k)}| > s_{max}$, then $\lambda_i^{(k)}$ and $\Delta q_{i,opt}^{(k+1)}$ is set to 0. If $|\lambda_i^{(k)}| \leq s_{max}$, then $\Delta q_{i,opt}^{(k+1)}$ is computed as per Equation (16). Correction of $\lambda_i^{(k)}$ is referred to as $\lambda$-adjustment. In the (k+1)th iteration, for example, $\Delta q_{i,opt}^{(k+1)}$ can be calculated for $=1, 2, \ldots, 2N_u$. Given these values of $\lambda_i^{(k)}$, $i=1, \ldots, 2N_u$, $\tilde{u}^{(k)}$ can be updated as follows:

$$\tilde{u}^{(k+1)} = \tilde{u}^{(k)} + \tau \lambda_j^{(k)} e_j \qquad \text{Equation (20)}$$

$$j = \underset{i}{\text{argmin}} \Delta q_{i,opt}^{(k+1)}$$

The values of $\lambda_j^{(k)}$ used in Equation (20) are after the $\lambda$-adjustment described above. The value $z^{(k+1)}$ can also be evaluated. From Equation (17):

$$z^{(k+1)} - z^{(k)} = F(\tilde{u}^{(k+1)} - \tilde{u}^{(k)}) \qquad \text{Equation (21)}$$

Using Equation (20), Equation (21) can be rewritten as:

$$z^{(k+1)} - z^{(k)} + \tau \lambda_j^{(k)} f_j \qquad \text{Equation (22)}$$

where $f_j$ refers to the jth column of F. Finally, the algorithm terminates after some iteration n upon meeting the below condition where the energy is no longer reduced:

$$[\underset{i}{\min} \Delta q_{i,opt}^{(n+1)}] \geq 0 \qquad \text{Equation (23)}$$

The algorithm follows a monotonic descent in $\|G\tilde{u}^{(k)}\|^2$ with every iteration and a local minima is reached. Since $\lambda_i^{(k)}$ can take values only from a finite integer valued set S, and $\|G\tilde{u}^{(k)}\|^2$ has a global minima for perturbations with $\lambda_i^{(k)} \in S$, the proposed algorithm will terminate in a finite number of iterations.

A summary of the proposed NDS algorithm is given in the table below:

TABLE 1

1. Choose the set S; $s_{max} = \max_{s \in S} s$

2. $\tilde{u}^{(0)} = u$; $F = G^T G$; $k = 0$ (k is iteration index)
3. $z^{(0)} = F\tilde{u}^{(0)}$; $\tau = 2|c_{max}| + \delta$
4. nsymb = $2N_{ui}$ (nsymb is $2N_u$ for QAM and $N_u$ for PAM)
5. for i = 1, 2, ..., nsymb 6. $\lambda_i^{(k)} = -\text{sgn}(z_i^{(k)}) \left\lceil \frac{|z_i^{(k)}|}{\tau F_{(i,i)}} \right\rceil$ 7. if $(|\lambda_i^{(k)}| > s_{max}) \lambda_i^{(k)} = 0$
8. $\Delta q_{i,opt}^{(k+1)} = \lambda_i^{(k)^2} \tau^2 F_{i,i} + 2\lambda_i^{(k)} \tau z_i^{(k)}$
9. end; (end of for in Step 5)

10. $\Delta q_{min} = \min_i \Delta q_{i,opt}^{(k+1)}$ 11. if $(\Delta q_{min} > 0)$ go to Step 16

12. $j = \underset{i}{\text{argmin}} \Delta q_{i,opt}^{(k+1)}$

13. $\tilde{u}^{(k+1)} = \tilde{u}^{(k)} + \tau \lambda_j^{(k)} e_j$
14. $z^{(k+1)} = z^{(k)} + \tau \lambda_j^{(k)} f_j$
15. k = k + 1, go to step 5
16. Terminate the algorithm The per-symbol computation complexities of $G^T G$ in Step 2 and $z^{(0)}$ in Step 3 are $O(N_u N_t)$ and $O(N_u)$, respectively. Step 5 to Step 15 is one iteration of the proposed algorithm, whose per-symbol complexity is constant. A mean number of successive sequential iterations until the algorithm terminates obtained through simulations has been found to be proportional to $N_u$; i.e., constant per-symbol complexity. Taking the individual complexities together, the overall per-symbol complexity of the proposed NDS algorithm is $O(N_u N_t)$. This low-complexity feature enables practical precoding for large number of users (e.g., on the order of hundreds).

Figure 3:
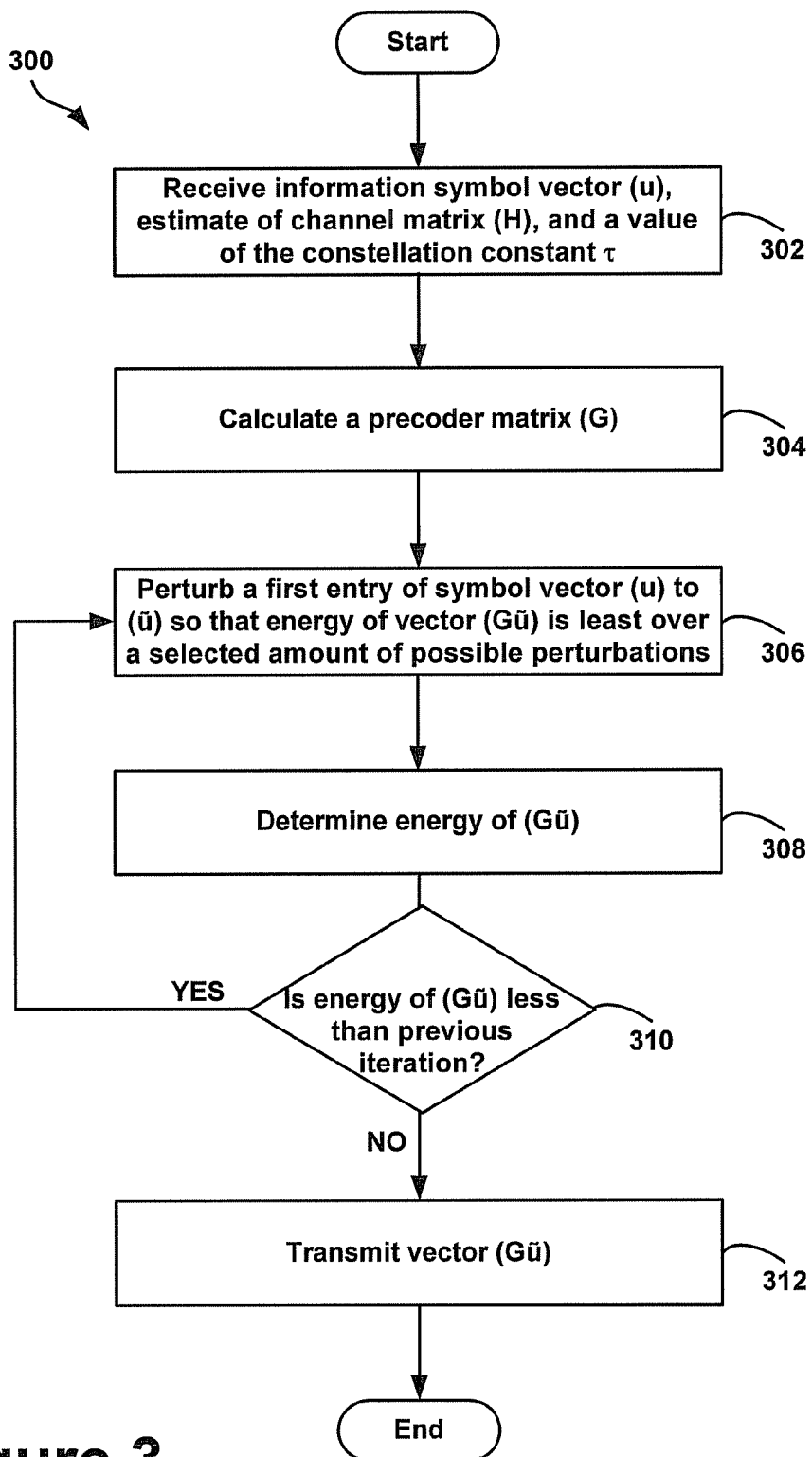
FIG. 3 is a flowchart depicting example steps of a method for precoding information symbols for transmission.

FIG. 3 is a flowchart depicting example steps of a method 300 for precoding information symbols for transmission. It should be understood that the flowchart shows functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive. In addition, each block may represent circuitry that is wired to perform the specific logical functions in the process. Alternative implementations are included within the scope of the example embodiments of the present application in which functions may be executed out of order from that shown or discussed, including substantially concurrent or in reverse order, depending on the functionality involved, as would be understood by those reasonably skilled in the art.

Initially, a computing device or precoder receives an information symbol vector, u, an estimate of the channel matrix, H, and a value of τ (i.e., constellation constant), as shown at block 302. The precoder next obtains a precoder matrix G from the estimate of the channel matrix H using Equation (7) (e.g., $G_{ZF} = H^T(HH^T)^{-1}$) as shown at block 304. The precoder may perform the calculation of Equation (7), or the precoder may receive the matrix G from a computing device that is coupled to the precoder.

Following, using the vector u, the precoder perturbs one entry of u to ũ in such a way that energy (i.e., norm) of a vector (Gũ) (which is the vector to be transmitted) is the least over all or a selected amount of possible perturbations, as shown at block 306. As one example, in a system employing 4-QAM modulation, the value of τ for 4-QAM is 4. If a first element $u_1$ of the vector u (i.e., $u=[u_1, u_2, u_3, \ldots]$) is −1, then perturbing $u_1$ according to Equation (9) means changing its value from −1 to either (−1+τ) or (−1−τ), which gives +3 or −5. The precoder will choose the perturbation between 3 and −5 that results in minimum transmit energy.

As another example, if $N_t=2$, $N_u=2$ and 4-QAM modulation is used (e.g., τ=4), and u=[−1 +1 +1 −1], a first entry of u can be perturbed in two different manners; either $u_1+\tau$ or $u_1-\tau$. The two possibilities of the vector u after perturbation thus include the vector u=[+3 +1 +1 −1] and u=[−5 +1 +1 −1]. The entries other than the first entry in u remain fixed at the moment, since only one entry of the vector u is perturbed at a time so as to reduce complexity of the algorithm.

Thus, u is perturbed to ũ using Equations 9-11 above. In example embodiments, to reduce the overall computational complexity of Equations 9-11, the perturbation vector p is a vector constrained to have only one non-zero entry. Thus, to perturb a first entry of the vector u, the perturbation vector p is [1 0 0 0], and to perturb a second entry of the vector u, the perturbation vector is [0 1 0 0 0 ...], and so on so that using Equation 9 (i.e., ũ=u+τp), ũ will have only one entry that is perturbed at a time.

The precoder performs perturbations in an iterative fashion. In each iteration, the perturbed vector from a previous iteration is updated one entry (or possibly more entries) at a time, and if energy of the updated transmit vector is less than energy of the transmit vector of the previous iteration, the update is performed. Thus, after perturbing one entry of u, the precoder determines the energy of the vector (Gũ), as shown at block 308. For example, using the numbers above with respect to 4-QAM, the precoder will determine the energy of the vector (Gũ) for values of ũ between 3 and −5. If the energy of (Gũ) of a present iteration is less than the energy of (Gũ) of a previous iteration, the precoder attempts to perturb another entry of u, as shown at block 310. The energy of (Gũ) of the present iteration is maintained for comparison with the energy of (Gũ) of the next iteration of block 310 in making the comparison. Otherwise, the precoder transmits the vector (Gũ), as shown at block 312. The method 300 continues until an energy of the vector (Gũ) does not decrease, at which point a minimum in energy is considered to be found. Thus, not every entry in the vector u may be perturbed or altered.

In one example, if there are multiple update possibilities that result in a decrease in energy, then the update that results in the largest decrease in energy is selected, and the algorithm moves to the next iteration. For example, using the numbers above with respect to 4-QAM, there can be multiple ways to change one entry (e.g., perturb ũ between 3 and −5), and the precoder will select a perturbation that results in a lowest energy level of the transmit signal. If none of the updates results in a decrease in energy, then the algorithm terminates.

The precoder achieves low-complexity by searching for a perturbation vector over a reduced search space since only one, or alternatively, a small number of entries of the vector u are altered at a time. A brute-force search for finding an optimum perturbation vector p would require searching over all $2N_t$-dimensional vectors with integer entries. This exhaustive search space grows exponentially with $N_t$. However, the complexity in the method 300 is reduced because a search for the perturbation vector p is performed in a local neighborhood. The search is performed in a constrained manner such that only the perturbation vectors that make the perturbed vector differ from the vector before perturbation in only one (or possibly more than one) entry is considered in the search.

The local neighborhood is considered to include one or more than one entry. The smaller the local neighborhood, the less complexity introduced into the algorithm. For example, if the local neighborhood is considered to be one move over in the constellation, then the precoder algorithm would be minimally complex. However, the neighborhood can be defined to include those vectors that differ from an original vector in two locations, three locations, 4, etc, up to $N_t$ (e.g., number of transmit antennas). Further, the number of transmit antennas ($N_t$) could be is equal to the number of users ($N_u$), or the system could be established to have more transmit antennas than number of users ($N_t > N_u$). The precoder scales well (i.e., complexity and computational demands are less) for large number of antennas, while giving improved performance for increasing number of antennas (see the bit error rate curves in FIG. 5 below for increasing number of antennas).

Using the method 300 in FIG. 3, a transmitter can perturb a vector and transmit the perturbed vector to a user via a wireless communication channel. A user may then wirelessly receive the perturbed vector and decode the received vector.

Figure 4:
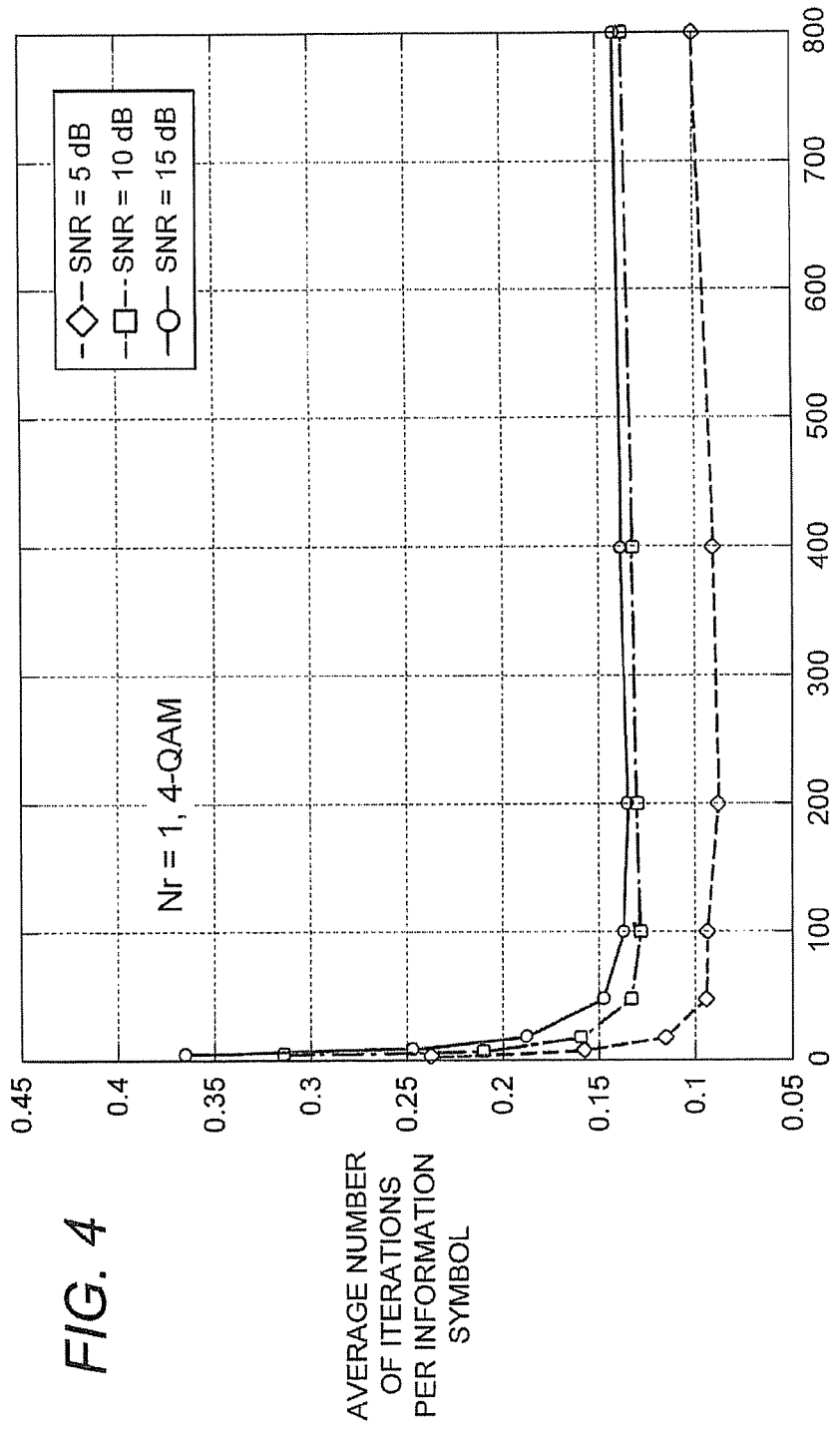
FIG. 4 illustrates example simulation outputs relating to a mean number of iterations until the algorithm in FIG. 3 terminates.

FIG. 4 illustrates example simulation outputs relating to a mean number of iterations until the algorithm in method 300 terminates. As shown, the mean number of iterations is proportional to $N_u$; i.e., constant per-symbol complexity.

From Equation 1, the receive vector y is given by y=Hx+n. In terms of detection at a receiver of a user, $\tilde{p}$ is set to be an approximate (or optimal) solution to Equation 11 (e.g., the perturbation vector). The received signal vector (after scaling by $\|Gu\|$) is then given by:

$$y = (u + \tau\tilde{p}) + \tilde{n}, \text{where}$$

$$\tilde{n} = \|G(u + \tau\tilde{p})\| n \qquad \text{Equation (24)}$$

A detected symbol vector at the receiver is given by:

$$\tilde{u} = y - \tau \left[ \frac{y + \frac{\tau}{2}}{\tau} \right] \qquad \text{Equation (25)}$$

In Equation 25, the operation is defined on each entry of the vector since each user receives only one entry of the vector y because each user has only one receive antenna. The y vector is a global vector that has one entry for each user. However, the algorithm can be scaled for users that have more than one receive antenna as well.

Figure 5:
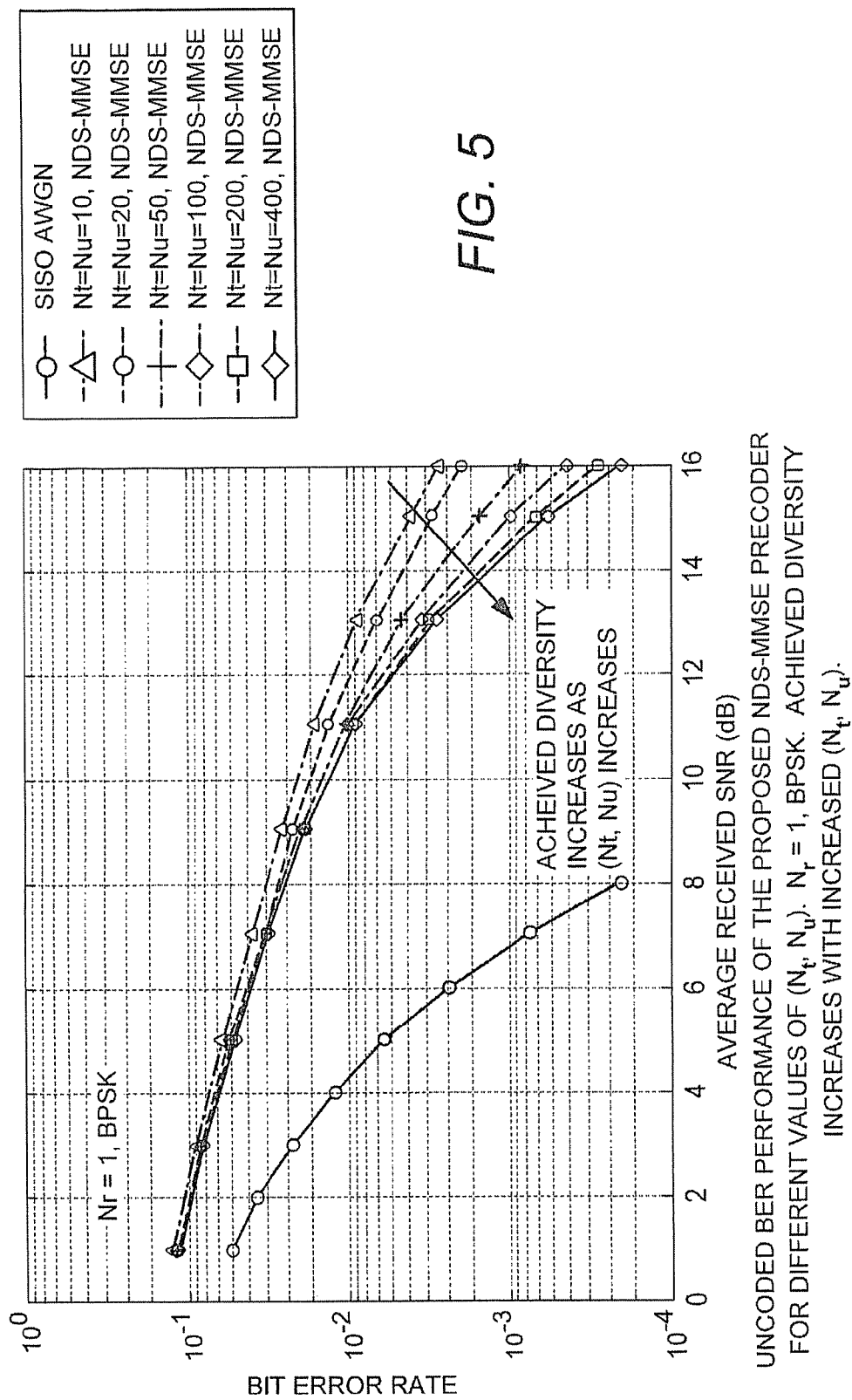
FIG. 5 illustrates example simulation results including uncoded bit error rate (BER) performance of the precoder for different values of number of transmitters and number of users.

Simulations were performed using the method 300 and results are shown in FIGS. 5-6. In the simulation results, the G matrix was set to be the minimum mean square error (MMSE) precoding matrix.

FIG. 5 illustrates example simulation results including uncoded bit error rate (BER) performance of the precoder for different values of number of transmitters and number of user. The uncoded BER is illustrated as a function of average received SNR with BPSK and $N_r=1$, for different values of ($N_t$, $N_u$). Perfect knowledge of the channel matrix is also assumed in this simulation. The performance of uncoded BRSK in single input single output (SISO) all white Gaussian noise (AWGN) (e.g., given by Q($\sqrt{SNR}$) is also plotted for comparison purposes.

In FIG. 5, it can be observed that the precoder achieves increased diversity with increasing ($N_t$, $N_u$). A slope of the BER curves from small to large ($N_t$, $N_u$). For example, an uncoded BER of $2 \times 10^{-3}$ is achieved at an SNR of 16 dB for $N_t = N_u = 20$, and the same BER is achieved at an SNR of 13.5 dB for $N_t = N_u = 200$. This is due to the large system effect in the precoder. For large ($N_t$, $N_u$), the BER curves show near-exponential fall (parallel to SISO AWGN curve) with some SNR loss from the SISO AWGN performance. The SNR loss is may be due to the reduced search space employed in the algorithm. Similar performance behavior has also been observed for 4-QAM as well.

FIG. 6 illustrates example simulation results for the precoder that shows BER performance with and without channel estimation errors. FIG. 6 shows the coded BER performance of a system with $N_t = N_u = 300$, 4-QAM, rate-3/4 turbo code, and $N_r = 1$. The sum rate (sum-capacity) in this system is given by $300 \times 2 \times 3/4 = 450$ bits/channel use. An ergodic sum-capacity of the model in (1) is given by:

$$C_{sum} = E[\sup_{D \in A} \log(|I_{N_t} + \rho H_c^H D H_c|)] \qquad \text{Equation (26)}$$

where $I_{Nt}$ is the $N_t \times N_t$ identity matrix, A is the set of $N_u \times N_u$ diagonal matrices D with non-negative elements that sum to 1 (i.e., tr(D)=1), and p is the average SNR defined as $1/\sigma^2$. The sum-capacity in Equation 26 was evaluated as a function of SNR for a $N_t = N_u = 300$ system through Monte-Carlo simulations, and the minimum SNR required to achieve a sum-capacity was obtained to be 450 bits/channel use. This SNR limit at 450 bits/channel use capacity (obtained to be 3 dB from simulations) is also shown in FIG. 6.

To illustrate the effect of channel estimation errors on performance, a channel estimation error model is considered where the estimated channel matrix, $\hat{H}_c$, is taken to be $\hat{H}_c = H_c + \Delta H_c$, where $\Delta H_c$ is the estimation error matrix and has entries that are assumed to be i.i.d complex Gaussian with zero mean and variance $\sigma_e^2$. The values of $\sigma_e^2$ are 0, 0.01, and 0.02. Note that $\sigma_e^2 = 0$ corresponds to perfect channel estimation.

As seen in FIG. 6, with perfect channel estimation (i.e., $\sigma_e^2 = 0$), the precoder achieves vertical fall in turbo-coded BER at about 13 dB (i.e., 10 dB away from the limit SNR at capacity). A linear MMSE precoder (without the NDS algorithm), on the other hand, achieves the vertical fall only at about 16 dB, for example. It is noted that the order of complexity for the NDS-MMSE and the linear MMSE are the same, with the proposed NDS-MMSE performing better than the linear MMSE.

The robustness of the proposed NDS-MMSE precoder to imperfect channel estimation is improved as compared to the linear MMSE. For example, for $\sigma_e^2 = 0.02$, the vertical fall occurs at about 15 dB for the NDS-MMSE, and for the linear MMSE, vertical fall does not occur and a high error floor results (i.e., uncoded error rate with channel estimation errors is high in linear MMSE to an extent that even the turbo code may be unable to avoid the error floor).

Figure 7:
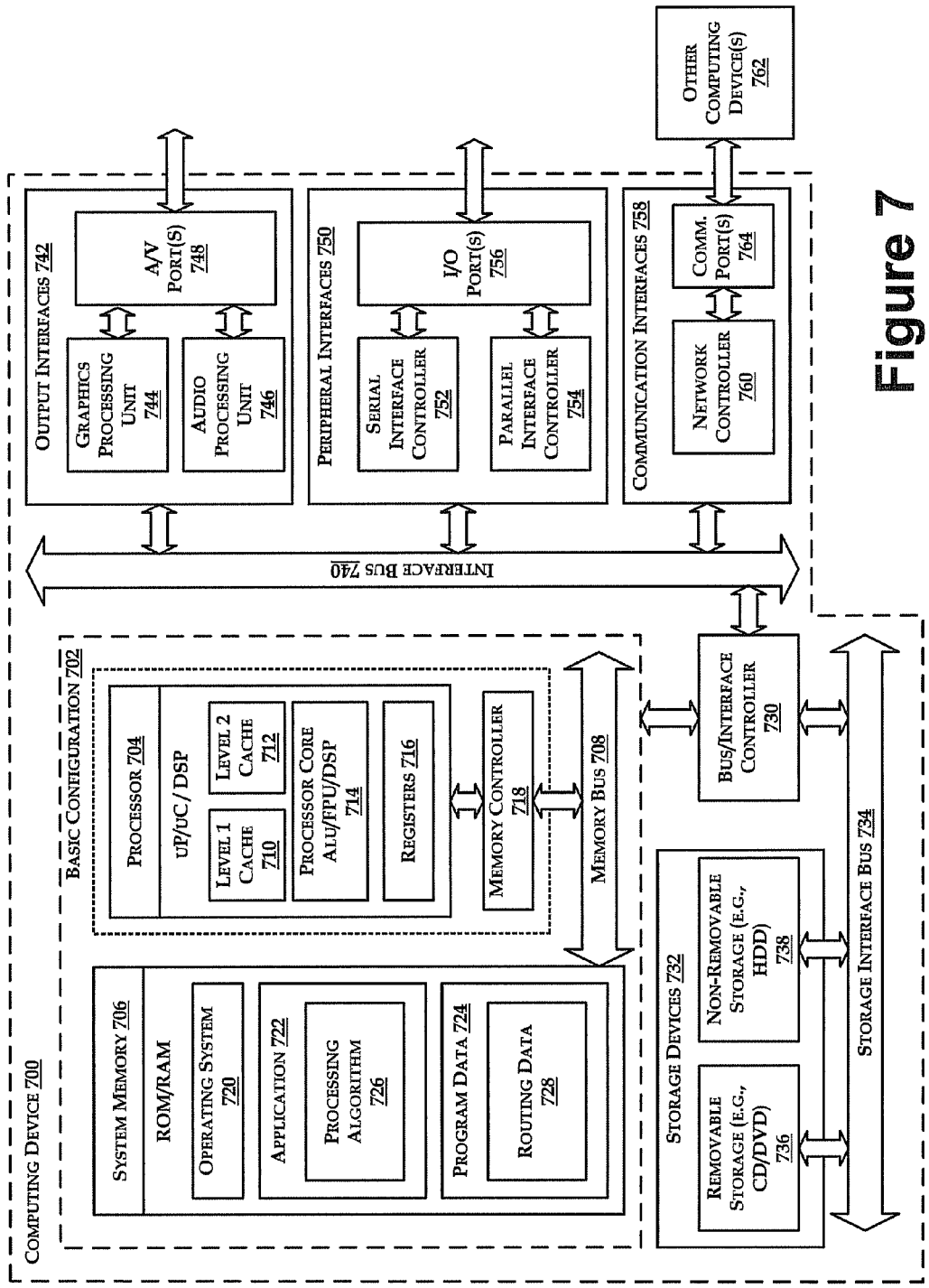
FIG. 7 is a block diagram illustrating an example computing device that may be arranged as any of the base station or users as shown in FIG. 1, or as the precoder shown in FIG. 2.
Figure 1:
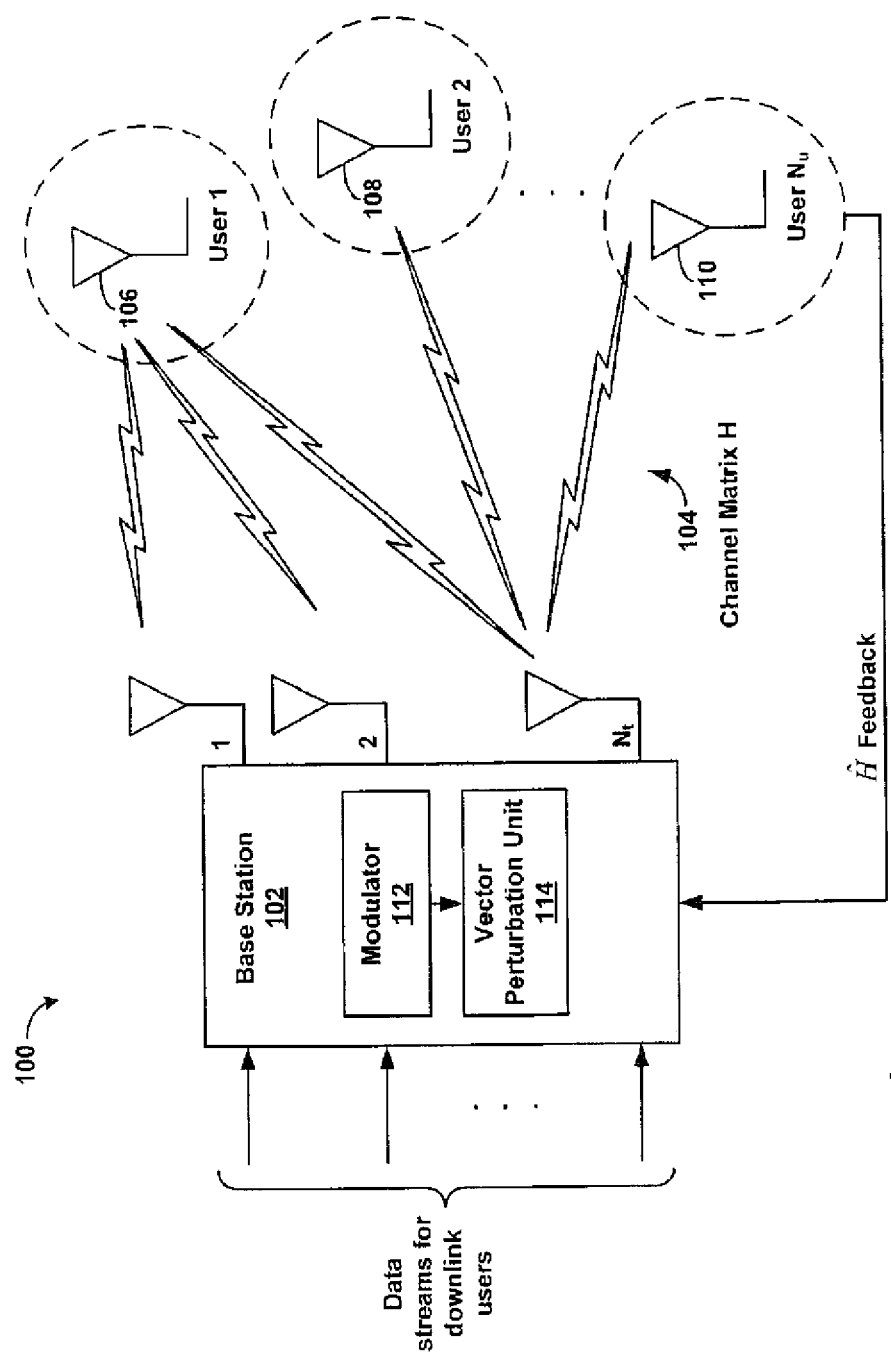
Figure 2:
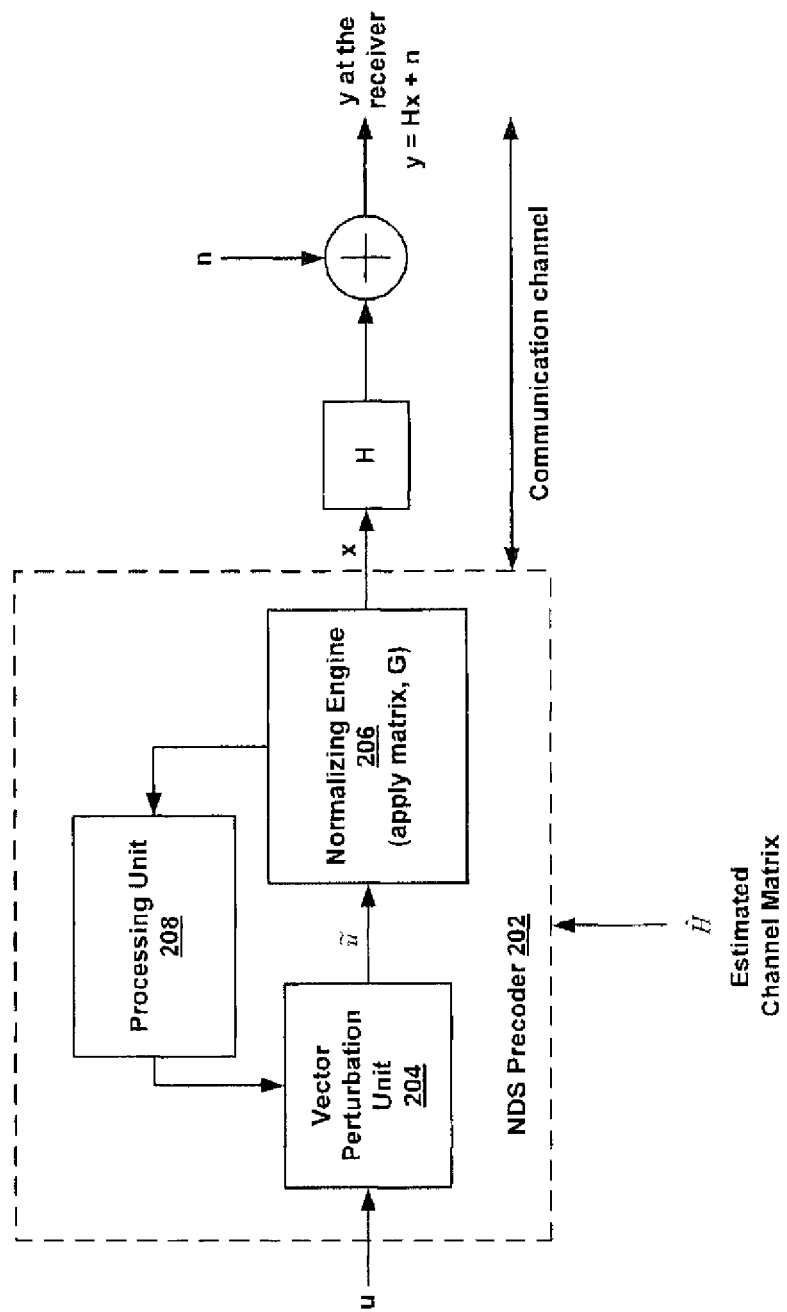
Figure 3:
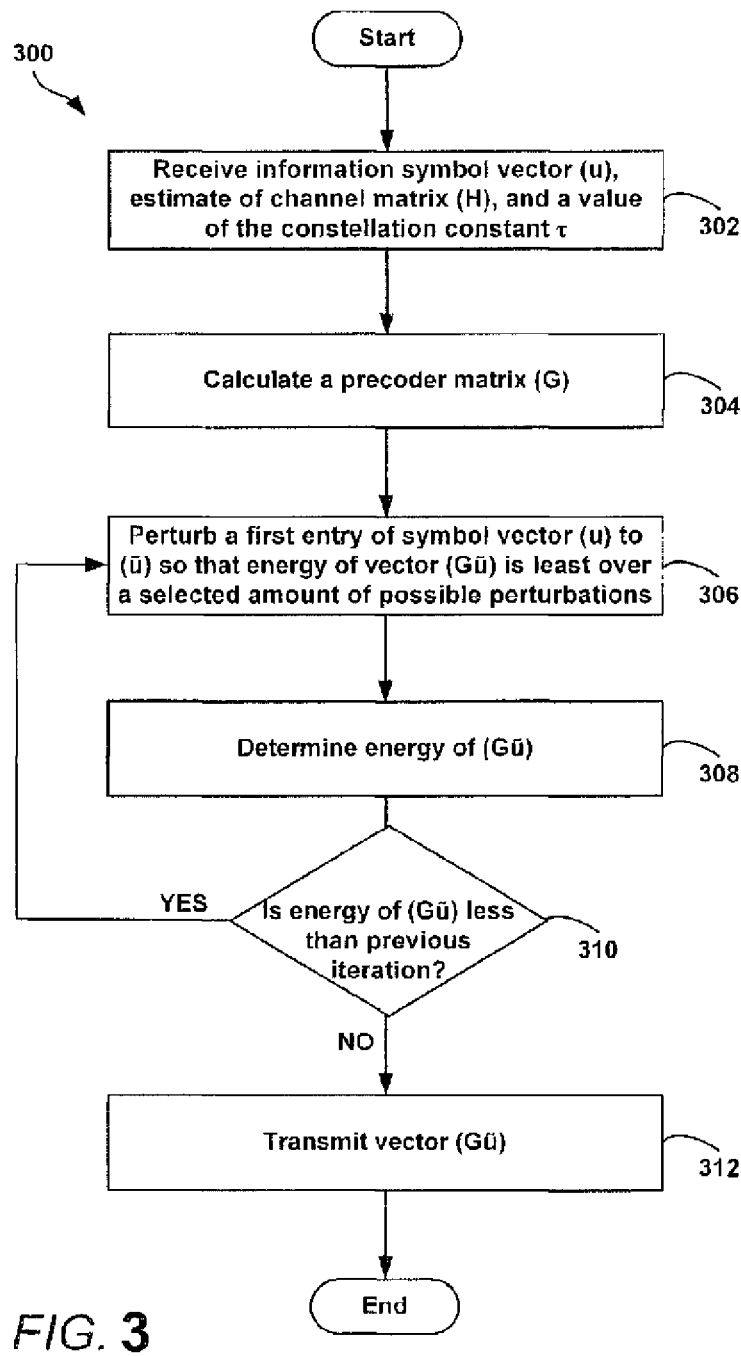
Figure 4:
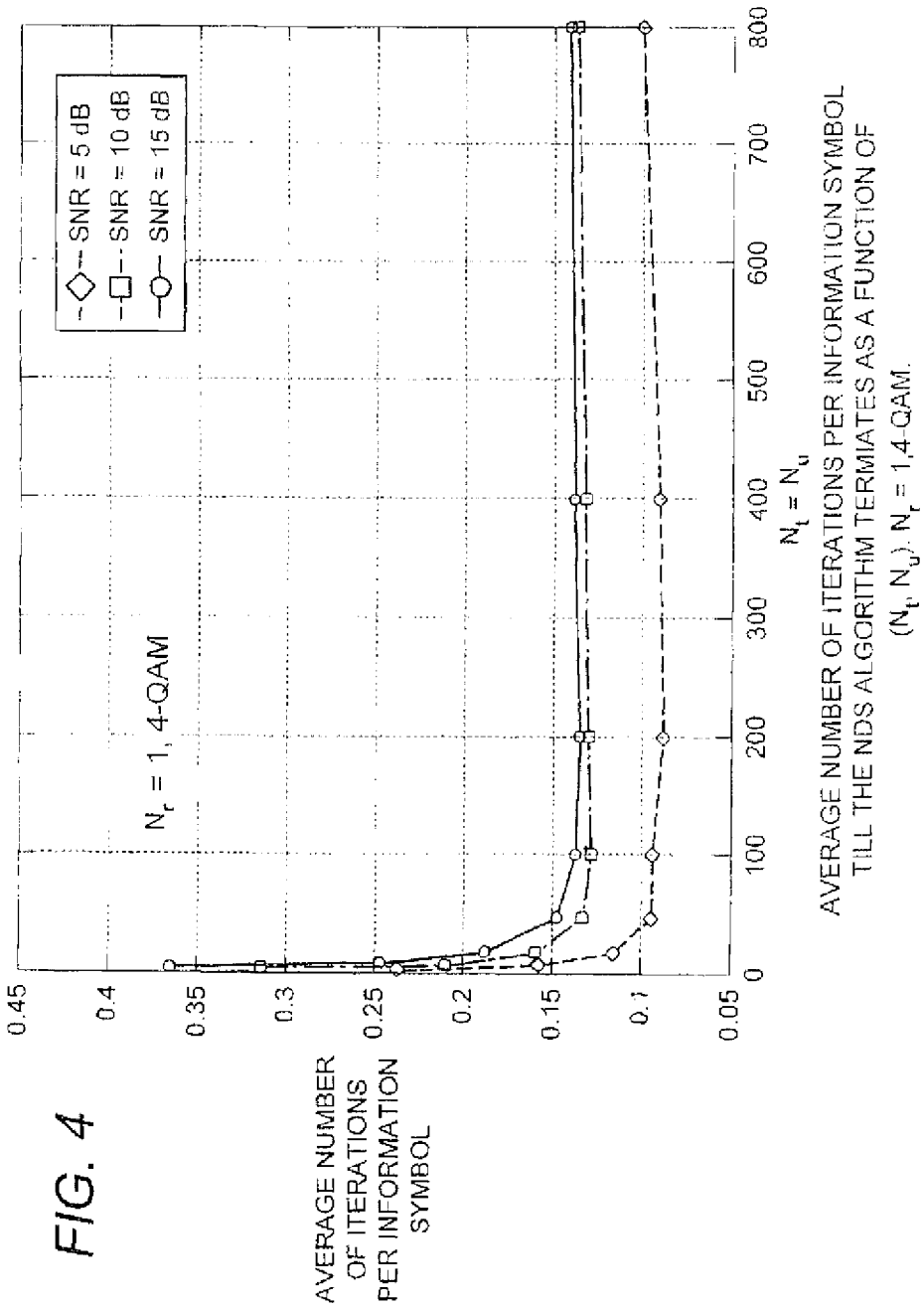
Figure 5:
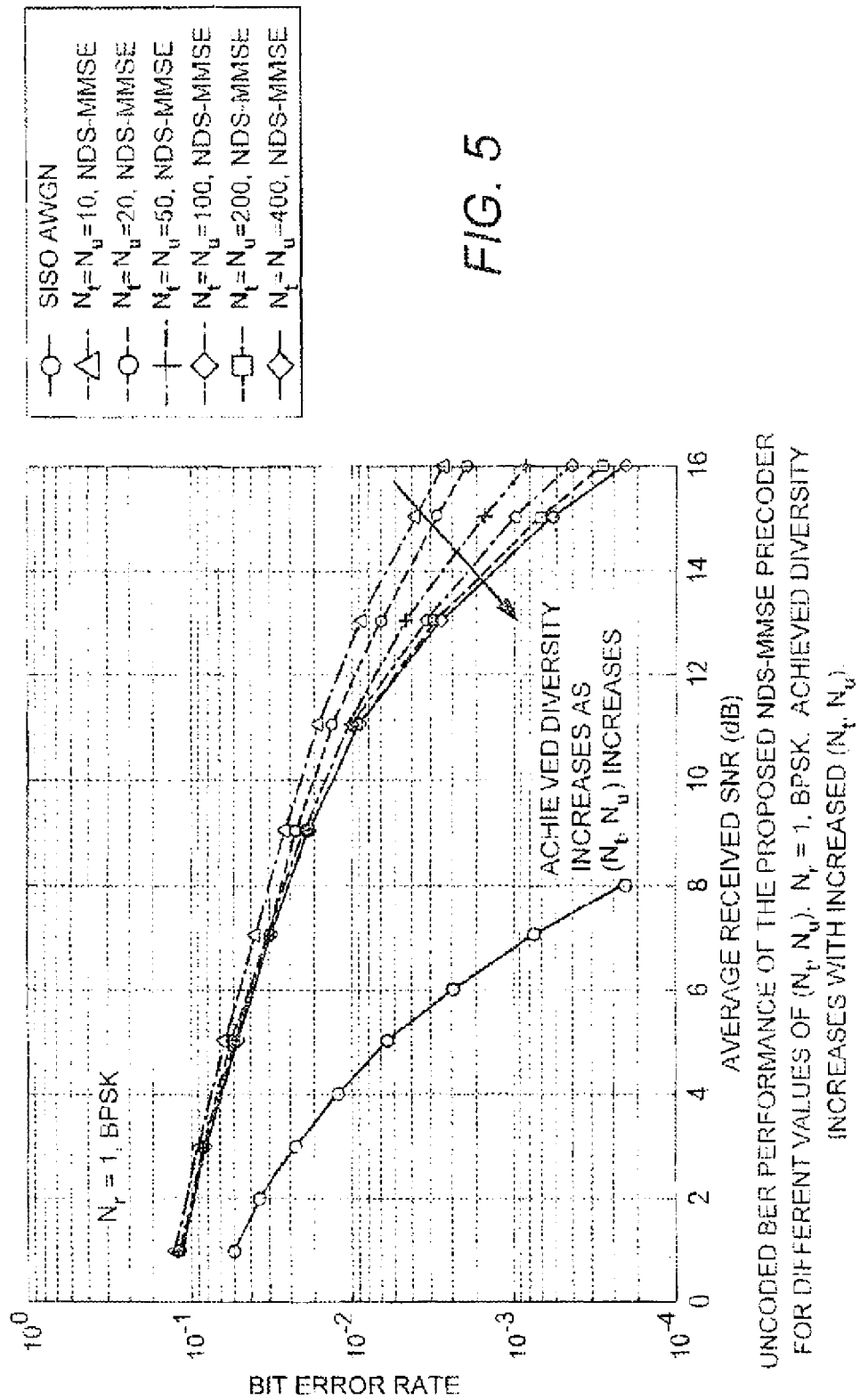
Figure 7:
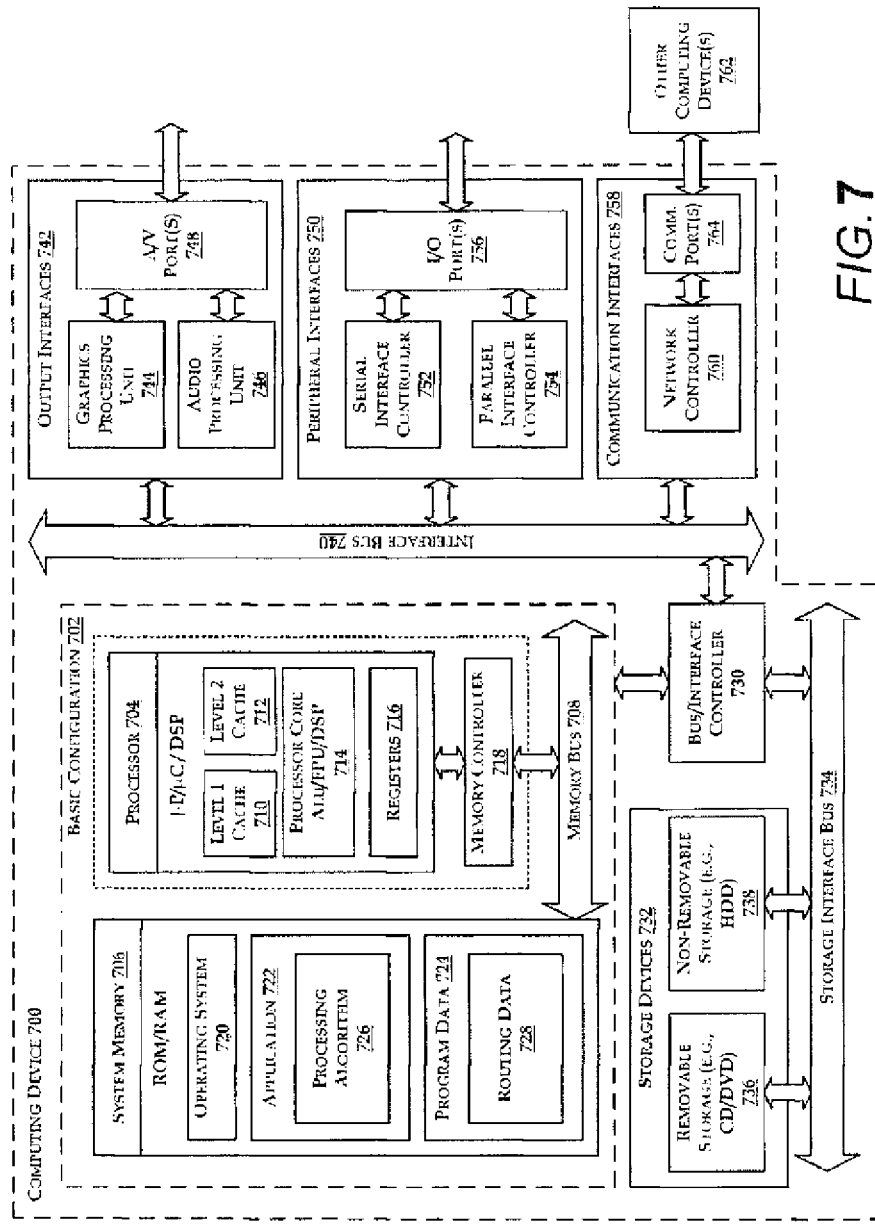

FIG. 7 is a block diagram illustrating an example computing device 700 that may be arranged as any of the base station or users as shown in FIG. 1, or as the precoder shown in FIG. 2. In a basic configuration 702, the computing device 700 typically includes one or more processors 704 and system memory 706. A memory bus 708 can be used for communicating between the processor 704 and the system memory 706.

Depending on a desired configuration, the processor 704 can be of any type including but not limited to a microprocessor (μP), a microcontroller (μC), a digital signal processor (DSP), or any combination thereof. The processor 704 can include one more levels of caching, such as a level one cache 710 and a level two cache 712, a processor core 714, and registers 716. The processor core 714 can include an arithmetic logic unit (ALU), a floating point unit (FPU), a digital signal processing core (DSP Core), or any combination thereof. A memory controller 718 can also be used with the processor 704, or in some implementations the memory controller 718 can be an internal part of the processor 704, for example.

Depending on a desired configuration, the system memory 706 can be of any type including but not limited to volatile memory (such as RAM), non-volatile memory (such as ROM, flash memory, etc.) or any combination thereof. The system memory 706 typically includes an operating system 720, one or more applications 722, and program data 724. The application 722 includes, for example, a processing algorithm 726 that is executable to perform any of the method shown in FIG. 3, for example, depending on an application of the computing device 700. The program data 724 includes routing data 728 that is useful for indicating routing of messages in a network, for example. In some example embodiments, the application 722 can be arranged to operate with the program data 724 on the operating system 720 such that messages are transmitted and received by selected relays, for example. This described basic configuration 702 is illustrated in FIG. 7 by those components within dashed line 702.

The computing device 700 can have additional features or functionality, and additional interfaces to facilitate communications between the basic configuration 702 and any required devices and interfaces. For example, a bus/interface controller 730 can be used to facilitate communications between the basic configuration 702 and one or more data storage devices 732 via a storage interface bus 734. The data storage devices 732 can be removable storage devices 736, non-removable storage devices 738, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media can include volatile and nonvolatile, removable and non-removable media implemented in any method or technology for storage of information, such as computer readable instructions, data structures, program modules, or other data.

The system memory 706, removable storage 736 and non-removable storage 738 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by the computing device 700. Any such computer storage media can be part of the computing device 700.

The computing device 700 can also include an interface bus 740 for facilitating communication from various interface devices (e.g., output interfaces, peripheral interfaces, and communication interfaces) to the basic configuration 702 via the bus/interface controller 730. Example output interfaces 742 include a graphics processing unit 744 and an audio processing unit 746, which can be configured to communicate to various external devices such as a display or speakers via one or more audio/visual (A/V) ports 748. Example peripheral interfaces 750 include a serial interface controller 752 or a parallel interface controller 754, which can be configured to communicate with external devices such as input devices (e.g., keyboard, mouse, pen, voice input device, touch input device, etc.) or other peripheral devices (e.g., printer, scanner, etc.) via one or more input/output (I/O) ports 756. An example communication interface 758 includes a network controller 760, which can be arranged to facilitate communications with one or more other computing devices 762 over a network communication via one or more communication ports 762. The Communication connection is one example of a communication media. Communication media may typically be embodied by computer readable instructions, data structures, program modules, or other data in a modulated data signal, such as a carrier wave or other transport mechanism, and includes any information delivery media. A "modulated data signal" can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), infrared (IR) and other wireless media. The term computer readable media as used herein can include both storage media and communication media.

The present application applies to MISO systems, and may be beneficial within MISO systems that include a large number of antennas at the base station (BS) so as to achieve a larger sum-capacity of the system. As the number of BS transmit antennas is increased, the number of users that could be supported will increase. In addition, the present application applies to other systems as well, such as to MIMO (where the user include multiple antennas).

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

It should be further understood that this and other arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location.

What is claimed is:

1. A method of precoding vectors in a communication system, the method comprising:
   receiving an information symbol vector u and a channel matrix H;
   calculating a transmit vector x using the information symbol vector u and the channel matrix H;
   perturbing an entry of the information symbol vector u;
   determining an energy value of the transmit vector, wherein if the energy value of the transmit vector x decreased, perturbing another entry of the information symbol vector u, and if the energy value of the transmit vector x did not decrease, transmitting the transmit vector x,
   wherein the method comprises perturbing one entry of the information symbol vector u at a time.

2. The method of claim 1, further comprising calculating a precoder matrix G from the channel matrix H using the following equation, $G=H^T(HH^T)^{-1}$, and wherein the transmit vector x is calculated according to the equation, $x=Gu$, where G is an $(N_t \times N_u)$ precoding matrix, and where $N_t$ is a number of transmit antennas, and $N_u$ is a number of users.

3. The method of claim 2, wherein perturbing an entry of the information symbol vector u comprises perturbing the entry so as to minimize an energy value of Gu.

4. The method of claim 1, wherein perturbing an entry of the information symbol vector u comprises adding to the information symbol vector u a vector $\tau p$, in which $\tau$ is a positive real number determined based on a modulation scheme and the vector p has only one non-zero entry that corresponds to an entry of the information symbol vector u that is being perturbed.

5. The method of claim 1, wherein perturbing an entry of the information symbol vector u comprises perturbing the information symbol vector u in such a way that a transformed vector ũ is another point in a lattice of a constellation of symbols used by the information symbol vector u such that:

$$\tilde{u}=u+\tau p$$

where p is a perturbation vector and $\tau$ is a positive real number.

6. The method of claim 5, wherein $\tau$ is a constellation constant value and is given by:

$$\tau=2|c_{max}|+\delta$$

where $|c_{max}|$ is a maximum value of either a real or imaginary component of constellation symbols used by the information symbol vector u, and $\delta$ is a spacing between the constellation symbols.

7. The method of claim 5, wherein perturbing an entry of the information symbol vector u comprises changing a value of the entry of the information symbol vector u by an amount between $-\tau$ and $+\tau$.

8. The method of claim 1, wherein perturbing an entry of the information symbol vector u results in a perturbed vector $\tilde{u}$, and the determining step further comprises:
   determining a first energy value of a transmit vector x using the information symbol vector u and the channel matrix H;
   determining a second energy value of a transmit vector x using the perturbed vector and the channel matrix H; and
   comparing the first energy value and the second energy value.

9. The method of claim 1, wherein the energy value of the transmit vector x is a squared magnitude of a precoder matrix multiplied by the information symbol vector u.

10. The method of claim 9, wherein the precoder matrix is given by $G=H^T(HH^T)^{-1}$.

11. The method of claim 1, wherein the method iteratively sequentially perturbs entries of the information symbol vector u until the energy value of the transmit vector x is at a minimum.

12. The method of claim 1, wherein the method iteratively sequentially perturbs entries of the information symbol vector u until no decrease in the energy value of the transmit vector x occurs.

13. The method of claim 1, wherein a bit-error rate (BER) of a received signal decreases for an increase in a number of base station antennas ($N_t$) and users ($N_u$).

14. The method of claim 1, wherein a received signal-to-noise ratio (SNR) increases with an increase in a number of base station antennas ($N_t$) and users ($N_u$).

15. The method of claim 1, further comprising perturbing more than one entry of the information symbol vector u.

16. A non-transitory computer-readable medium containing a set of instructions for causing a computing device to perform the functions of:
   receiving an information symbol vector u and a channel matrix H;
   calculating a transmit vector x using the information symbol vector u and the channel matrix H;
   perturbing an entry of the information symbol vector u;
   if an energy value of the transmit vector x decreased, perturbing another entry of the information symbol vector u; and
   if the energy value of the transmit vector x did not decrease, transmitting the transmit vector x,
   wherein the functions comprise perturbing one entry of the information symbol vector u at a time.

17. The non-transitory computer-readable medium of claim 16, wherein perturbing an entry of the information symbol vector u results in a perturbed vector $\tilde{u}$, and the instructions further cause the computing device to perform the functions of:
   determining a first energy value of a transmit vector x using the information symbol vector u and the channel matrix H;
   determining a second energy value of a transmit vector x using the perturbed vector $\tilde{u}$ and the channel matrix H; and
   comparing the first energy value and the second energy value.

18. The non-transitory computer-readable medium of claim 16, wherein perturbing an entry of the information symbol vector u comprises perturbing the entry so as to minimize an energy value of the transmit vector x.

19. The non-transitory computer-readable medium of claim 16, wherein the instructions cause the computing device to iteratively perturb entries of the information symbol vector u until the energy value of the transmit vector x is at a minimum.

20. A precoder comprising:
   a vector perturbation unit for receiving an information symbol vector u and perturbing an entry of the information symbol vector u to generate a perturbed information symbol vector $\tilde{u}$; and
   a processing unit for receiving a channel matrix H and calculating a transmit vector x using the information symbol vector u and the channel matrix H, and if an energy value of the transmit vector x is smaller when using the perturbed information symbol vector $\tilde{u}$ as compared to when using the information symbol vector u, instructing the vector perturbation unit to perturb another entry of the information symbol vector u.

21. The precoder of claim 20, wherein if the energy value of the transmit vector x is not smaller when using the perturbed information symbol vector $\tilde{u}$ as compared to when using the information symbol vector u, the processing unit transmits the transmit vector x as calculated using the information symbol vector u.

22. The precoder of claim 20, wherein the vector perturbation unit perturbs the information symbol u so as to minimize the energy value of the transmit vector x.

23. The precoder of claim 20, wherein the vector perturbation unit iteratively perturbs entries of the information symbol vector u until the energy value of the transmit vector x is at a minimum.

* * * * *

UNITED STATES PATENT AND TRADEMARK OFFICE
CERTIFICATE OF CORRECTION

PATENT NO. : 8,320,432 B1
APPLICATION NO. : 12/430635
DATED : November 27, 2012
INVENTOR(S) : Chockalingam et al.

It is certified that error appears in the above-identified patent and that said Letters Patent is hereby corrected as shown below:

On the Title Page, in Item (56), under "OTHER PUBLICATIONS", in Column 2, Line 4, delete "vector-perturnation" and insert -- vector-perturbation --, therefor.

On the Title Page, in Item (56), under "OTHER PUBLICATIONS", in Column 2, Line 8, delete "sustems" and insert -- systems --, therefor.

On Title Page 2, in Item (56), under "OTHER PUBLICATIONS", in Column 1, Line 22, delete "H.." and insert -- H., --, therefor.

In the Drawings

Delete Drawing Sheets 1-7, and replace with new Drawing Sheets 1-7. (Attached)

In the Specifications

In Column 4, Line 48, delete "vector" and insert -- vector ũ --, therefor.

In Column 7, Line 4, delete "Equation (12)=" and insert -- Equation (12) --, therefor.

In Column 7, Line 48, delete "i=1, … ,$2N_u$." and insert -- i=1, … ,$2N_u$. --, therefor.

In Column 7, Line 51, delete "is ª" and insert -- is a --, therefor.

In Column 7, Line 56, Equation (16), delete " $\Delta q_{i,opt}^{(k+1)} = \lambda_i^{(k)^{2}} \tau^2 F_{i,i} + 2\lambda i^{(k)} \tau z_i^{(k)}$ " and insert -- $\Delta q_{i,opt}^{(k+1)} = \lambda_i^{(k)^2} \tau^2 F_{i,i} + 2\lambda i^{(k)} \tau z_i^{(k)}$ --, therefor.

Signed and Sealed this
Eleventh Day of June, 2013

Teresa Stanek Rea
*Acting Director of the United States Patent and Trademark Office*

CERTIFICATE OF CORRECTION (continued)
U.S. Pat. No. 8,320,432 B1

In Column 8, Line 34, delete "for =1," and insert -- for i =1, --, therefor.

In Column 8, Line 52, Equation (22), delete "$z^{(k+1)} - z^{(k)} + \tau \lambda_j^{(k)} f_j$" and insert -- $z^{(k+1)} = z^{(k)} + \tau \lambda_j^{(k)} f_j$ --, therefor.

In Column 12, Line 28, delete "p" and insert -- ρ --, therefor.

FIG. 6

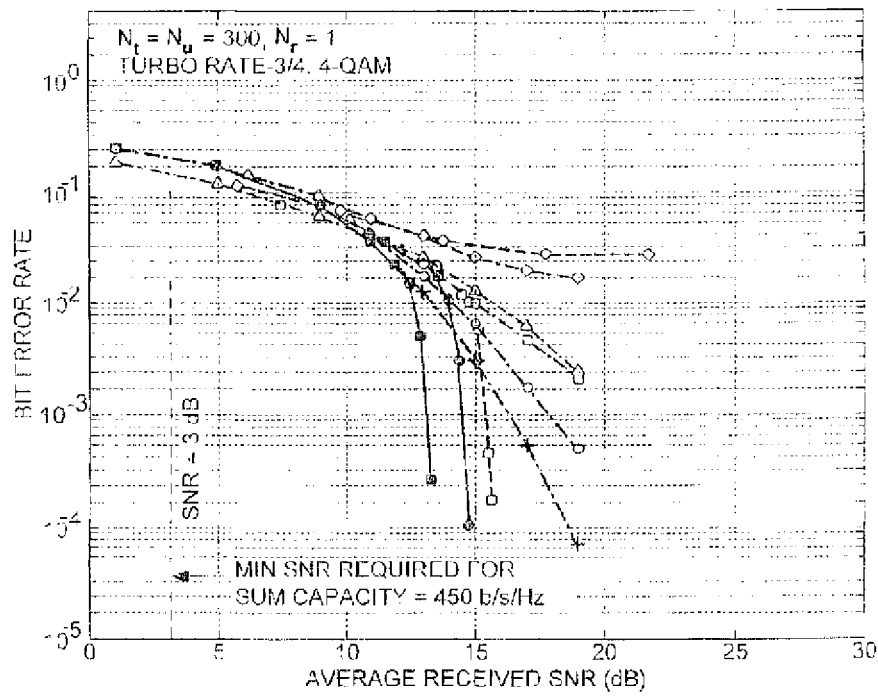

TURBO CODED BER PERFORMANCE OF THE PROPOSED NDS-MMSE
PRE-CODER WITHOUT AND WITH CHANNEL ESTIMATION ERRORS.
$N_t = N_u = 300$, $N_r = 1$, RATE-3/4 TURBO CODE, 4-QAM
SUM RATE = 300 X 2 X 3/4 = 450 BITS/CHANNEL USE.

- —■— TURBO NDS-MMSE (EST. ERR. VAR = 0)
- —◆— TURBO NDS-MMSE (EST. ERR. VAR = 0.02)
- —□— TURBO MMSE-ONLY (EST. ERR. VAR = 0)
- —◇— TURBO MMSE-ONLY (EST. ERR. VAR = 0.02)
- --◇-- UNCODED NDS-MMSE (EST. ERR. VAR = 0.05)
- --□-- UNCODED NDS-MMSE (EST. ERR. VAR = 0.02)
- --○-- UNCODED NDS-MMSE (EST. ERR. VAR = 0.01)
- --+-- UNCODED NDS-MMSE (EST. ERR. VAR = 0.0)
- --△-- UNCODED MMSE-ONLY (EST. ERR. VAR = 0)